United States Patent [19]
von Strandtmann et al.

[11] 3,879,427

[45] Apr. 22, 1975

[54] DERIVATIVES OF POLYCYCLIC GAMMA-PYRONES

[75] Inventors: Maximilian von Strandtmann, Rockaway; John Shavel, Jr., Mendham; Sylvester Klutchko, Hackettstown; Marvin P. Cohen, New Milford, all of N.J.

[73] Assignee: Warner-Lambert Company, Morris Plains, N.J.

[22] Filed: Aug. 13, 1973

[21] Appl. No.: 387,861

Related U.S. Application Data

[63] Continuation-in-part of Ser. No. 309,329, Nov. 24, 1972, Pat. No. 3,798,240, which is a continuation-in-part of Ser. No. 112,765, Feb. 4, 1971, abandoned.

[52] U.S. Cl................................. 260/345.2; 424/283
[51] Int. Cl................................................ C07d 7/32
[58] Field of Search................................ 260/345.2

[56] References Cited
UNITED STATES PATENTS

| | | | |
|---|---|---|---|
| 3,345,416 | 10/1967 | Russell | 260/590 |
| 3,355,494 | 11/1967 | Lyness et al. | 260/586 |
| 3,798,240 | 3/1974 | von Strandtmann et al. | 260/345.2 |

*Primary Examiner*—John M. Ford
*Attorney, Agent, or Firm*—Albert H. Graddis; Frank S. Chow; Anne M. Kelly

[57] ABSTRACT

The present invention relates to novel polycyclic gamma-pyrone derivatives having a hydroxymethyl group on the 3-position, and to a novel process for their production. These compounds, and pharmaceutical compositions containing these compounds, are useful for the treatment of allergic conditions and for the treatment of hyperacidity.

6 Claims, No Drawings

DERIVATIVES OF POLYCYCLIC GAMMA-PYRONES

CROSS-REFERENCE TO RELATED APPLICATION

This application is a continuation-in-part of our copending application, Ser. No. 309,329, filed Nov. 24, 1972, now U.S. Pat. No. 3,798,240 which is, in turn, a continuation-in-part of applicants' copending application, Ser. No. 112,765, filed Feb. 4, 1971 now abandoned.

SUMMARY OF THE INVENTION

This invention related to novel 3-(hydroxymethyl) derivatives of polycyclic gamma-pyrones having the formula I:

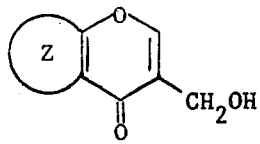

I wherein the Z ring has one of the following structures:

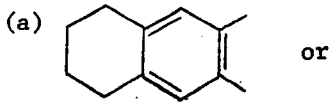

or

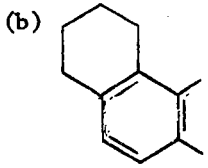

and to a novel process of their preparation, starting with the corresponding o-hydroxy-ω-(methylsulfinyl)acetonaphthone. These novel compounds, and novel pharmaceutical compositions containing these compounds, are useful for the treatment of allergic conditions and for the treatment of hyperacidity.

DETAILED DESCRIPTION OF THE INVENTION

The novel compounds of this invention having the general formula I:

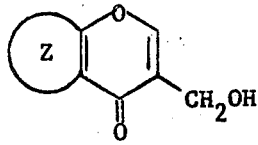

I wherein the Z ring has one of the following structures:

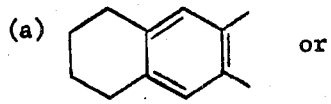

or

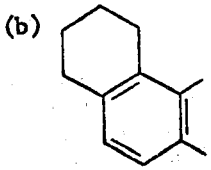

are active orally or by injection in preventing the allergic and asthmatic reactions in mammals such as cats, dogs, guinea pigs and the like. Thus, for example, in tests conducted according to the procedures described in *Life Sciences*, 7, 465 (1963), and in *Proc. Soc. Exptl. Biol. Med.*, 81,584 (1952), the compounds of this invention when administered to the respective animals such as rats and guinea pigs at a dose of about 5 to 100 mg/kg are capable of alleviating allergic and asthmatic conditions in these animals.

The compounds of this invention are useful in providing symptomatic relief of allergic conditions such as asthma, hay fever and the like. Generally speaking, these compounds are administered orally, by injection or in the form of an inhaler at a dose of about 5 to 100 mg/kg.

The compounds of formula I also exhibit antisecretory effects and are therefore useful in relieving gastric hyperacidity.

At a dosage of 20 mg/kg, administered intraperitoneally, the subject compositions are effective in reducing gastric acidity in the pylorus ligated rat when tested according to the procedure of H. Shay, Gastroenterology, 5, 43, (1945).

For parenteral administration, the pharmaceutical compositions containing the compounds of formula I may be administered as aqueous suspensions for intramuscular injection. These are prepared, for example, by suspending the active ingredient in sterile water.

The compounds of formula I may also be formulated with known pharmaceutical diluents such as water, lactose, powdered sugar, mannitol and the like into dosage forms such as tablets, capsules, and the like.

Certain derivatives of the 3-(hydroxymethyl)polycyclic gammapyrones of formula I also display anti-allergenic and acid inhibiting properties. Thus, the corresponding 3-formyl-gamma-pyrones, which are obtained by oxidizing compounds of formula I of this invention, are useful in the treatment of allergic conditions and for the treatment of hyperacidity. These 3-formyl-gamma-pyrones are the subject of co-pending U.S. application Ser. No. 352,135, filed Apr. 18, 1973.

According to the present invention, novel compounds of the formula I are obtained by reacting the starting material III below:

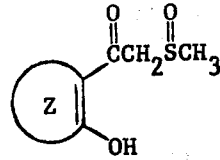

III wherein Z ring is as defined above, with two moles of formaldehyde, under basic conditions, to obtain intermediate II below:

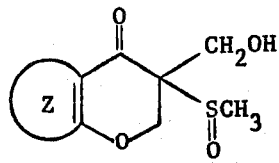

II wherein the Z ring is as defined above. A solvent solution of intermediate II is then heated to eliminate methylsulfenic acid (CH₃SOH) and obtain the desired compounds having formula I. The compounds of formula I may be obtained from o-hydroxy-ω-(methylsulfinyl)acetonaphtones with or without isolation of the intermediate compounds II, according to the novel process of this invention.

The starting materials III are prepared by the reaction of the corresponding ortho-hydroxy carboxylic acid esters (5,6,7,8-tetrahydro-3-hydroxy-2-naphthoate and 5,6,7,8-tetrahydro-1-hydroxy-2-naphthoate) with sodium methylsulfinyl carbanion generated by the action of sodium hydride on dimethyl sulfoxide. Starting materials III and the process for preparation are more fully described in co-pending application Ser. No. 392,152, filed Aug. 27, 1973 which is, in turn, a continuation-in-part of our co-pending application Ser. No. 174,947, filed August 25, 1971, and now U.S. Patent 3,801,644.

In order to further illustrate the practice of the invention the following examples are included:

EXAMPLE I

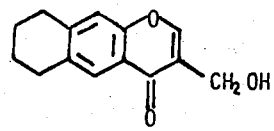

6,7,8,9-tetrahydro-3-(hydroxymethyl)-4H-naphtho[2,3,-b]pyran-4-one.

To a solution of 40 g of K₂CO₃ in water is added 15 g of 5',6',7',8'-tetrahydro-3'-hydroxy-2-(methylsulfinyl)-2'-acetonaphthone with stirring. A clear solution is obtained by the addition of 15 ml of methanol. The solution is treated with 34 ml of formalin, and after 15 min. an oil separates out. The mixture is extracted three times with 100 ml portions of CHCl₃. Combined extracts are dried over Na₂SO₄, and concentrated to an oil under reduced pressure. The oil is dissolved in 125 ml of toluene and the solution in boiled for 1/2 hr. On cooling, crystals form. These are filtered off and recrystallized from absolute ethanol; mp 129.5°–131.5°C.; yield 6 g (43%).

Anal. Calcd for C₁₄H₁₄O₃: C, 73.02; H, 6.13. Found: C, 73.25; H, 6.23.

EXAMPLE II

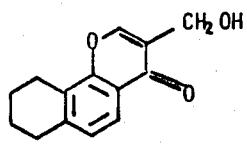

7,8,9,10-tetrahydro-3-(hydroxymethyl)-4H-naphtho[1,2-b]pyran-4-one to a solution of 32 g of K₂CO₃ in 320 ml of water is added, with stirring, 12 g of 5',6',-7',8'-tetrahydro-1'-hydroxy-2-(methylsulfinyl)-2'-acetonaphthone. The mixture is treated with 40 ml of methanol and 27 ml of formalin is added to the solution. After 15 minutes of stirring, an oil separates. The mixture is chilled, and extracted with 50 ml of CHCl₃. Combined extracts are dried over Na₂SO₄ and concentrated to an oil under reduced pressure. The oil is dissolved in 125 ml of toluene. The solution is boiled for 1/2 hr and cooled. The product is filtered off and recrystallized from absolute ethanol; mp 136°–138.5°C.; yield 5 g.

Anal. Calcd for C₁₄H₁₄O₃: C, 73.02; H, 6.13. Found: C, 73.25; H, 6.15.

We claim:

1. A compound of the formula I:

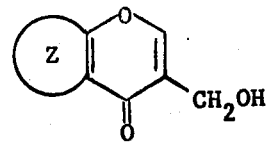

I wherein the Z ring has one of the following structures:

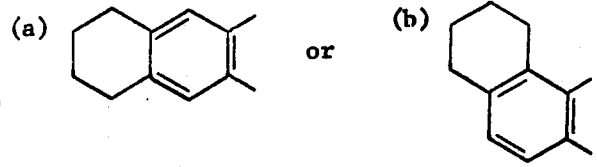

2. A compound according to claim 1 which is 6,7,8,9-tetrahydro-3-(hydroxymethyl)-4H-naphtho[2,3-b]pyran-4-one.

3. A compound according to claim 1 which is 7,8,9,10-tetrahydro-3-(hydroxymethyl)-4H-naphtho[1,2-b]pyran-4-one.

4. A compound of the formula II:

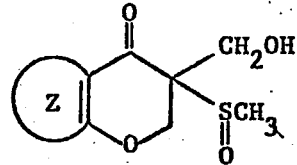

wherein the Z ring has one of the following structures:

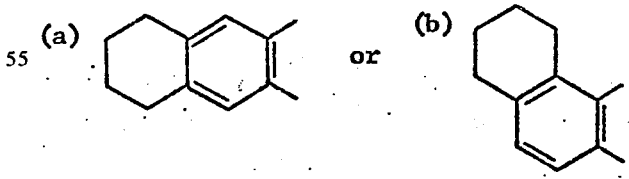

5. A compound according to claim 4 which is 2,3,6,7,8,9-hexahydro-3-(hydroxymethyl)-3-(methylsulfinyl)-4H-naphtho[2,3-b]pyran-4-one.

6. A compound according to claim 4 which is 2,3,7,8,9,10-hexahydro-3-(hydroxymethyl)-3-(methylsulfinyl)-4H-naphtho[1,2-b-pyran-4one.

* * * * *